US008358084B2

(12) United States Patent
Shiu et al.

(10) Patent No.: US 8,358,084 B2
(45) Date of Patent: Jan. 22, 2013

(54) LED CURRENT CONTROL CIRCUIT, CURRENT BALANCER AND DRIVING APPARATUS

(75) Inventors: Shian-Sung Shiu, Taipei County (TW); Li-Min Lee, Taipei County (TW); Chung-Che Yu, Taipei County (TW); Hai-Po Li, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 338 days.

(21) Appl. No.: 12/826,699

(22) Filed: Jun. 30, 2010

(65) Prior Publication Data

US 2011/0109231 A1 May 12, 2011

(30) Foreign Application Priority Data

Nov. 12, 2009 (TW) ............................... 98138325 A

(51) Int. Cl.
| G05F 1/00 | (2006.01) |
| H05B 37/02 | (2006.01) |
| H05B 39/04 | (2006.01) |
| H05B 41/36 | (2006.01) |

(52) U.S. Cl. .................... 315/291; 315/224; 315/106
(58) Field of Classification Search ................ 315/291, 315/36, 71, 106, 107, 171, 200, 224, 277, 315/279

See application file for complete search history.

(56) References Cited

U.S. PATENT DOCUMENTS

| 7,327,051 | B2 * | 2/2008 | Ito et al. ..................... 307/10.8 |
| 2006/0071614 | A1 * | 4/2006 | Tripathi et al. ............... 315/291 |
| 2009/0295776 | A1 * | 12/2009 | Yu et al. ........................ 345/212 |
| 2009/0322235 | A1 * | 12/2009 | Shiu et al. ................. 315/185 R |
| 2011/0089865 | A1 * | 4/2011 | Wang et al. ................... 315/297 |
| 2011/0109228 | A1 * | 5/2011 | Shimomura et al. .......... 315/113 |
| 2011/0309758 | A1 * | 12/2011 | Yu et al. ........................ 315/192 |
| 2011/0316447 | A1 * | 12/2011 | Liu ................................ 315/297 |
| 2012/0049761 | A1 * | 3/2012 | Yu et al. ........................ 315/294 |
| 2012/0176050 | A1 * | 7/2012 | Li et al. ......................... 315/192 |
| 2012/0217890 | A1 * | 8/2012 | Chang et al. .................. 315/224 |

* cited by examiner

*Primary Examiner* — Shawki Ismail
*Assistant Examiner* — Dylan White
(74) *Attorney, Agent, or Firm* — Jianq Chyun IP Office

(57) ABSTRACT

An LED current control circuit including a current adjusting unit, a detecting unit, and a current control unit is provided. The current adjusting unit has a current control end coupled to an LED string for determining an amount of current flowing through the LED string according to a current control signal. The detecting unit detects the current control end and determines whether to generate a protecting signal according to a protecting voltage value. The current control unit generates the current control signal to control the amount of current flowing through the LED string of and determines whether to stop the current flowing through the LED string according to the protecting signal.

17 Claims, 4 Drawing Sheets

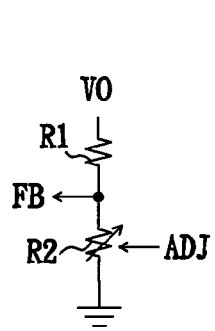
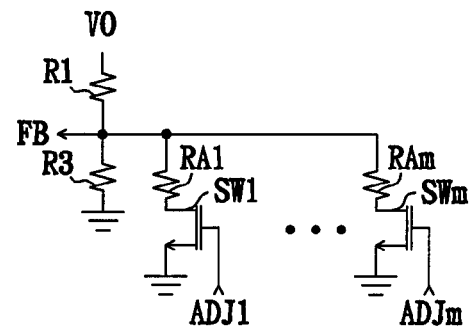
FIG. 7A          FIG. 7B
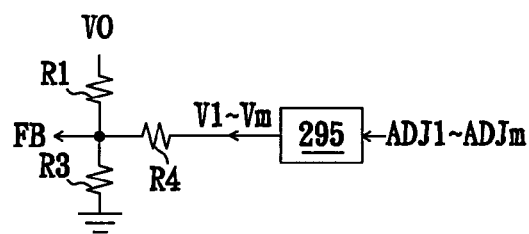
FIG. 7C
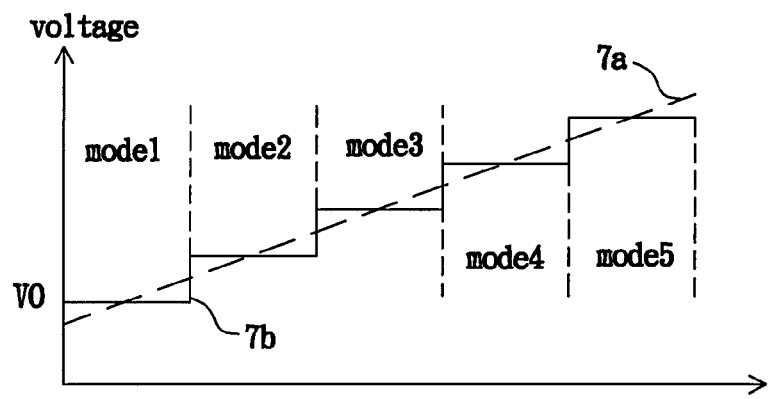
FIG. 8

LED CURRENT CONTROL CIRCUIT, CURRENT BALANCER AND DRIVING APPARATUS

CROSS-REFERENCE TO RELATED APPLICATION

This application claims the priority benefit of Taiwan application serial no. 98138325, filed on Nov. 12, 2009. The entirety of the above-mentioned patent application is hereby incorporated by reference herein and made a part of this specification.

BACKGROUND OF THE INVENTION

1. Field of the Invention

The invention generally relates to a light emitting diode (LED) current control circuit, a current balancer and a driving apparatus, and more particularly, to an LED current control circuit, a current balancer and a driving apparatus capable of adjusting the LED driving voltage to enhance the efficiency thereof.

2. Description of Related Art

The LED driving method can be classified into two types. One is providing a stable driving current to the LED in a current feedback control method; and another is providing a stable driving voltage to the LED in a voltage feedback control method. The latter provides a stable current flowing through the LED by a current control circuit. The advantages of the constant current driving method are high efficiency and stable light emitting. However, for driving a plurality of LED strings, an additional current balance circuit is required, so that the efficiency is lower. The advantage of the constant voltage driving method is that the control circuit is simply, and it is suitable for driving a plurality of LED strings.

FIG. 1 is a schematic circuit diagram of a conventional LED current driving apparatus in which the LED is driven by a constant driving voltage. Referring to FIG. 1, the LED driving apparatus includes an LED current control circuit 10, an LED module 60, and a power supply 70. The power supply 70 provides a stable output voltage VOUT through a voltage feedback signal VFB generated by a voltage feedback circuit. The LED module 60 includes a plurality of LED strings which are parallel between the power supply 70 and the LED current control circuit 10. The LED current control circuit 10 includes a current setting resistor 11 and a current mirror comprising a plurality of transistors 12 and 20. One end of the current setting resistor 11 is coupled to a voltage VCC, and the other end is coupled to the transistor 12, so that a setting current flows through the transistor 12. The transistors 20 are electrically connected to the corresponding LED strings in the LED module 60 one by one, and the current mirror mirrors the setting currents to the LED strings. Accordingly, the currents flowing through each LED string in the LED module 60 are substantially identical, so that the brightness of the LED strings is uniform.

Because the threshold voltages of the LEDs are much different, even if the currents are substantially identical, the required driving voltages are still different. For example, each LED string in the LED module 60 has 20 LEDs coupled in series, and the driving voltage for driving a single LED with 20 mA is about 3.4V-3.8V. Accordingly, the driving voltage range of the LED strings is about 68V-76V. the differences of the driving voltages of the LED strings are undertaken by the corresponding transistor 20. Moreover, for mirroring the current, the transistor 20 must operate in the saturation region. Accordingly, in order to ensure that the currents flowing through each LED string are substantially identical, the output voltage VOUT, provided by the power supply 70, must be higher than the maximum driving voltage among the LED strings to ensure that the transistors 20 operate in the saturation region.

However, it is hard to check the driving voltages of the LED strings one by one. The maximum driving voltages of the LED strings in the LED module 60 may be not 76V, the highest driving voltage among 68V-76V. However, for ensuring the output voltage VOUT being higher than the maximum driving voltage, the output voltage VOUT could be 80V. Accordingly, providing 80V driving voltage results in lower efficiency. Furthermore, in order to prevent any LED in the LED string from being damaged to cause the LED string not emitting light, some LED may be connected in parallel with the Zener diode. Hence, even if the damaged LED is open, the current can still flow through the corresponding Zener diode. The breakdown voltage of the Zener diode is set as a voltage, such as, being 2V higher than the threshold voltage of the LED to prevent the Zener diode from mis-operating. In this case, if there are two LEDs damaged in the LED string, the driving voltage of the LED string is raised up by 4V. Accordingly, it may cause that the current flowing through the LED string dramatically falls down, and even the LED string can not emit light any more. However, if the power supply 70 increases the output voltage VOUT to avoid any LED string not emitting light due to some damaged LED, the efficiency becomes much lower.

SUMMARY OF THE INVENTION

In the prior, by the constant driving voltage, the LED current driving apparatus provides a driving voltage higher than the need to ensure that the LED module can stably emit light. However, the higher driving voltage results in lower efficiency in the LED current driving apparatus. Accordingly, in order to enhance the efficiency of the LED driving apparatus and provide a predetermined current to the LED string which has a higher driving voltage or even in which a part of the LEDs are damaged. In an embodiment of the invention, by adjusting the voltage feedback circuit of the LED driving apparatus, the voltage feedback circuit is suitably adjusted or operates in a suitable mode with the state of the LED string to ensure that the LED string emits stable brightness.

An embodiment of the invention provides an LED current control circuit including a current adjusting unit, a detecting unit, and a current control unit. The current adjusting unit has a current control end coupled to an LED string, and the current adjusting unit determines an amount of a current flowing through the LED string according to a current control signal. The detecting unit detects the current control end and determines whether to generate a protecting signal according to a voltage protecting value. The current control unit generates the current control signal to control the amount of the current of the LED string and determines whether to stop the current flowing through the LED string according to the protecting signal.

Another embodiment of the invention provides an LED current balancer which is adapted to balance currents of a plurality of LED strings, wherein a voltage source circuit provides an output voltage to drive the LED strings. The LED current balancer includes a current balancing circuit, a detecting circuit, and an adjustment determining circuit. The current balancing circuit has a plurality of current balance ends coupled to the LED strings, and the current balancing circuit balances the currents of the LED strings. The detecting circuit detects voltages of the current balance ends to generate a plurality of corresponding detecting signals. An adjustment determining circuit generates at least one adjustment control signal according to the detecting signals. Herein, the at least one adjustment control signal controls a voltage feedback circuit to adjust a level of a voltage feedback signal indicative of the output voltage, generated by the voltage feedback circuit.

Another embodiment of the invention provides an LED driving apparatus including an LED module, a voltage source circuit, a voltage feedback circuit, and an LED current balancer. The LED module has a plurality of LED strings, and the voltage source circuit provides an output voltage to drive the LED module. The voltage feedback circuit generates a voltage feedback signal according to the output voltage, so that the output voltage is stabilized at a first voltage value. The LED current balancer has a plurality of current balance ends coupled to the LED module and balances currents flowing through each of the LED strings. Herein, the LED current balancer detects voltages of the current balance ends and generates at least one adjustment control signal to adjust the voltage feedback signal when the voltage of any one of the current balance ends is lower than a protecting voltage value, so that the output voltage is stabilized at a second voltage value, wherein the second voltage value is higher than the first voltage value.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A is a schematic circuit diagram of a voltage feedback circuit according to a first embodiment of the invention.

FIG. 7B is a schematic circuit diagram of a voltage feedback circuit according to a second embodiment of the invention.

FIG. 7C is a schematic circuit diagram of a voltage feedback circuit according to a third embodiment of the invention.

FIG. 8 shows the waveforms of the output voltages of the voltage feedback circuits respectively shown in FIG. 7A, FIG. 7B, and FIG. 7C in different modes.

DESCRIPTION OF EMBODIMENTS

Figure 1:
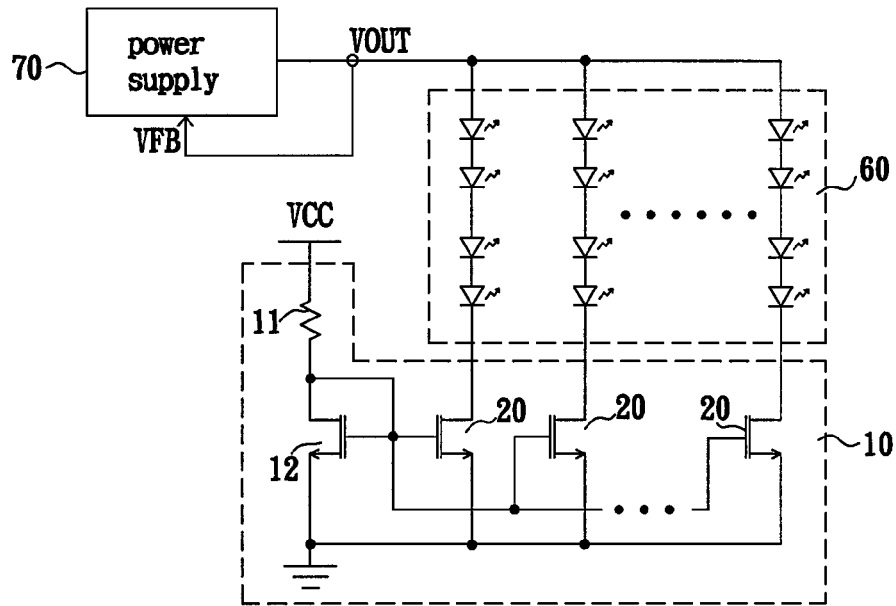
FIG. 1 is a schematic circuit diagram of a conventional LED current driving apparatus in which the LED is driven by the constant driving voltage.
Figure 2:
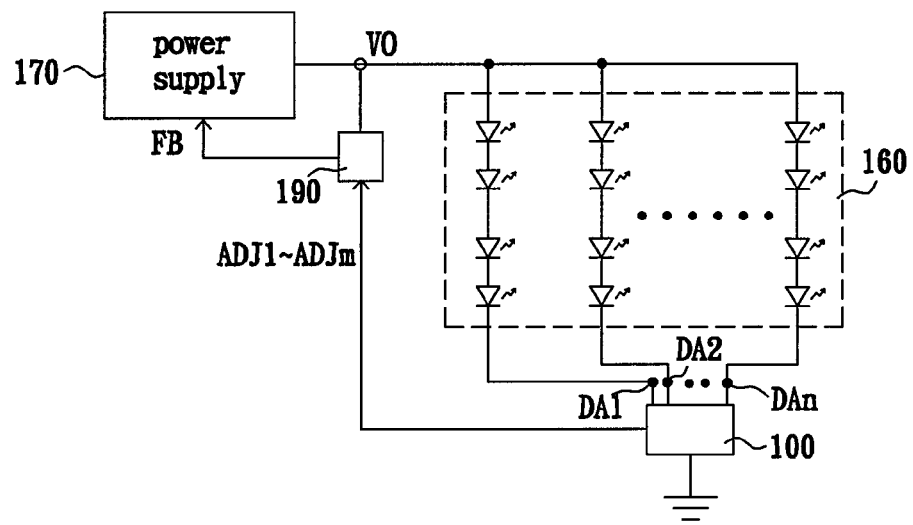
FIG. 2 is a schematic circuit diagram of an LED driving apparatus according to an embodiment of the invention.

FIG. 2 is a schematic circuit diagram of an LED driving apparatus according to an embodiment of the invention.

Referring to FIG. 2, the LED driving apparatus includes an LED current balancer 100, an LED module 160, a power supply 170, and a voltage feedback circuit 190. The LED module 160 includes a plurality of LED strings. An end of each LED string is coupled to the power supply 170 to receive an output voltage VO to be driven. Another end of each LED string is coupled to the corresponding current balance end DA1, DA2, . . . , and DAn of the LED current balancer 100. Herein, n is an integer larger than zero. The LED current balancer 100 is used to balance currents of each LED strings in the LED module 160, so that the currents flowing through each LED strings are almost equal, thereby generating similar brightness. The LED current balancer 100 generates at least one adjustment control signal ADJ1-ADJm according to the voltages of the current balance ends DA1, DA2, . . . , and DAn. Herein, m is an integer larger than zero. The voltage feedback circuit 190 generates a voltage feedback signal FB representing the level of the output voltage VO to the power supply 170 according to the output voltage VO, so that the power supply 170 can supply a stable output voltage VO. The voltage feedback circuit 190 also receives the least one adjustment control signal ADJ1-ADJm and determines whether to adjust the set or the mode of the voltage feedback circuit 190 according to the least one adjustment control signal ADJ1-ADJm, so that when any of the voltages of the current balance ends DA1, DA2, . . . , and DAn is lower than a protecting voltage value, the voltage feedback circuit 190 offsets the level of the voltage feedback signal FB, thereby stabilizing the output voltage VO at a new voltage value. Accordingly, it ensures that the voltages of the current balance ends DA1, DA2, . . . , and DAn are higher than the protecting voltage value.

Figure 3:
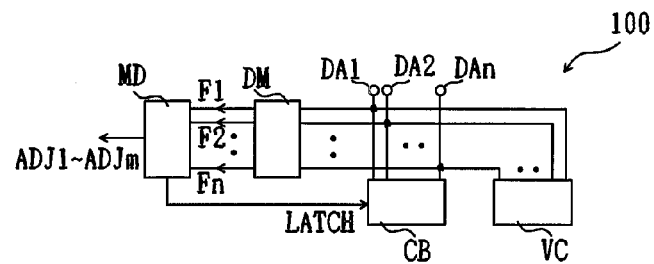
FIG. 3 is a schematic circuit diagram of an LED current balancer according to an embodiment of the invention.

FIG. 3 is a schematic circuit diagram of an LED current balancer according to an embodiment of the invention. Referring to FIG. 3, the LED current balancer 100 includes a current balancing circuit CB, a detecting circuit DM, and an adjustment determining circuit MD. The current balancing circuit CB has a plurality of current balance ends DA1, DA2, . . . , and DAn coupled to the LED strings, and the current balancing circuit is used to balance the currents of the LED strings. The detecting circuit DM detects the voltages of the current balance ends DA1, DA2, . . . , and DAn to generate a plurality of corresponding detecting signals F1, F2, . . . , and Fn. The adjustment determining circuit MD generates at least one adjustment control signal ADJ1-ADJm according to the detecting signals F1, F2, . . . , and Fn. When the states of the detecting signals F1, F2, . . . , and Fn do not change for a predetermined time after the adjustment control signals ADJ1-ADJm are generated, i.e. the erroneous state of the LED module 160 can not be reduced or removed, the adjustment determining circuit MD generates a latch protection signal LATCH to the current balancing circuit CB to stop the abnormal LED strings lighting in the LED module 160 or stop all the LED strings lighting in the LED module 160. The latch protection signal LATCH is continuously generated until the LED current balancer 100 is turned off or restarted. Furthermore, in the embodiment of the invention, the LED current balancer may further include a voltage clamping circuit which clamps the voltages of the current balance ends DA1, DA2, . . . , and DAn to ensure that the voltages of the current balance ends DA1, DA2, . . . , and DAn are not higher than a clamping voltage value. Herein, the clamping voltage value is higher than the protecting voltage value. Accordingly, when the operation, such as light adjusting, is performed, or the circuit abnormally operates to raise the voltages of the current balance ends DA1, DA2, . . . , and DAn, it ensures that the voltages are clamped under the clamping voltage value to avoid the current balancing circuit CB being damaged due to over voltage.

Figure 4:
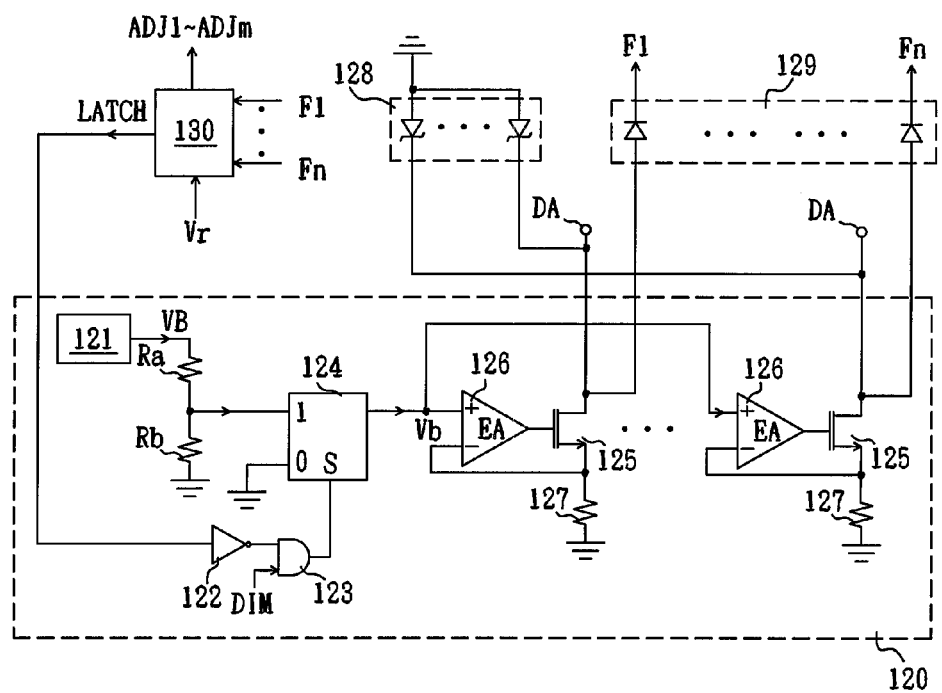
FIG. 4 is a schematic circuit diagram of an LED current balancer according to another embodiment of the invention.

FIG. 4 is a schematic circuit diagram of an LED current balancer according to another embodiment of the invention. Referring to FIG. 4, the LED current balancer includes a current balancing circuit 120, a voltage clamping circuit 128, a detecting circuit 129, and an adjustment determining circuit 130. The current balancing circuit 120 includes a reference voltage generator 121, resistors Ra and Rb, an inverter 122, an AND gate 123, a multiplexer 124, and a plurality of LED current control circuits. Herein, each of the LED current control circuits includes a current adjusting unit 125, an error amplifier 126, and a resistor 127. The reference voltage generator 121 generates a voltage reference signal VB, and, the voltage reference signal VB after be divided by the resistors Ra and Rb is inputted to the first input end of the multiplexer 124. The inverter 122 receives a latch protection signal LATCH generated by the adjustment determining circuit 130, and inverts the latch protection signal LATCH to output. The AND gate 123 receives the output signal of the inverter 122 and a light adjusting signal DIM and outputs a signal to the selection end S of the multiplexer 124. The second input end of the multiplexer 124 is grounded, and the multiplexer 124 selects the dividing signal of the resistors Ra and Rb or the zero voltage level to serve as a current control signal Vb according to the output signal of the AND gate 123. The non-inverting input end of the error amplifier 126 receives the current control signal Vb, and the inverting input end thereof is coupled to one end of the resistor 127. The current adjusting unit 125 may be an n-type transistor switch. The drain serves as the current control end DA and is coupled to the corresponding LED string, the source is coupled to the resistor 127, and the gate is coupled to the output end of the error amplifier 126. The error amplifier 126 controls the voltage drop of the resistor 127 to be equal to the level of the current control signal Vb and controls the current flowing through the current adjusting unit 125. When the latch protection signal LATCH is low, and the light adjusting signal DIM is high, the multiplexer 124 selects the dividing signal of the resistors Ra and Rb to serve as the current control signal Vb, so that a predetermined current flowing through the LED strings. On the contrary, when the latch protection signal LATCH is high or the light adjusting signal DIM is low, the multiplexer 124 selects the zero voltage level to serve as the current control signal Vb, so that the current flowing through the LED strings is zero.

The voltage clamping circuit 128 includes a plurality of Zener diodes. Herein, the negative end of each Zener diode is coupled to the corresponding current control end DA, and the positive end thereof is grounded. For the LED strings, when the voltages of the current balance ends DA1, DA2, . . . , and DAn is raised due to dimming or other errors, the voltage clamping circuit 128 can ensure that the voltages of the current control ends DA are close to or clamped under the breakdown voltage of the Zener diode. In this manner, it can not only avoid the current adjusting unit 125 being burnt out due to over high voltage but also reduce the specification of withstanding voltage in the current adjusting unit 125.

The detecting circuit 129 includes a plurality of diodes. Herein, the positive ends of them are respectively coupled to the current control ends DA of the current adjusting unit 125, and the negative ends thereof generate the detecting signals F1, F2, . . . , and Fn according to the voltage levels of the current control ends DA. The adjustment determining circuit 130 receives the detecting signals F1, F2, . . . , and Fn, a protecting voltage value Vr to determine whether all of the detecting signals F1, F2, . . . , and Fn are higher than the protecting voltage value Vr. If any of the detecting signals F1, F2, . . . , and Fn is lower than the protecting voltage value Vr, the adjustment determining circuit 130 generates at least one adjustment control signal ADJ1-ADJm to adjust the set or the mode of the voltage feedback circuit 190. After a predetermined time, the adjustment determining circuit 130 then determines whether the number of the detecting signals F1, F2, . . . , and Fn lower than the protecting voltage value Vr decreases. If the number of the detecting signals F1, F2, . . . , and Fn lower than the protecting voltage value Vr decreases but is not zero, the adjustment determining circuit 130 records the new set or the new mode of the voltage feedback circuit 190, and adjusts the set or the mode of the voltage feedback circuit 190 again. If the number of the detecting signals F1, F2, . . . , and Fn lower than the protecting voltage value Vr decreases to zero, the adjustment determining circuit 130 maintains the last set or the last mode of the voltage feedback circuit 190. However, if the number of the detecting signals F1, F2, . . . , and Fn lower than the protecting voltage value Vr does not decrease (i.e. it is constant or increases), the adjustment determining circuit 130 determines that the circuit is abnormal and generates a latch protection signal LATCH to the current balancing circuit 120. The inverter 122 inverts the latch protection signal LATCH to be low to make that the AND gate 123 also outputs the signal with a low level. Thereby, the multiplexer 124 selects the zero voltage level to serve as the current control signal Vb to stop the LED strings emitting light for protecting the circuit.

Figure 5:
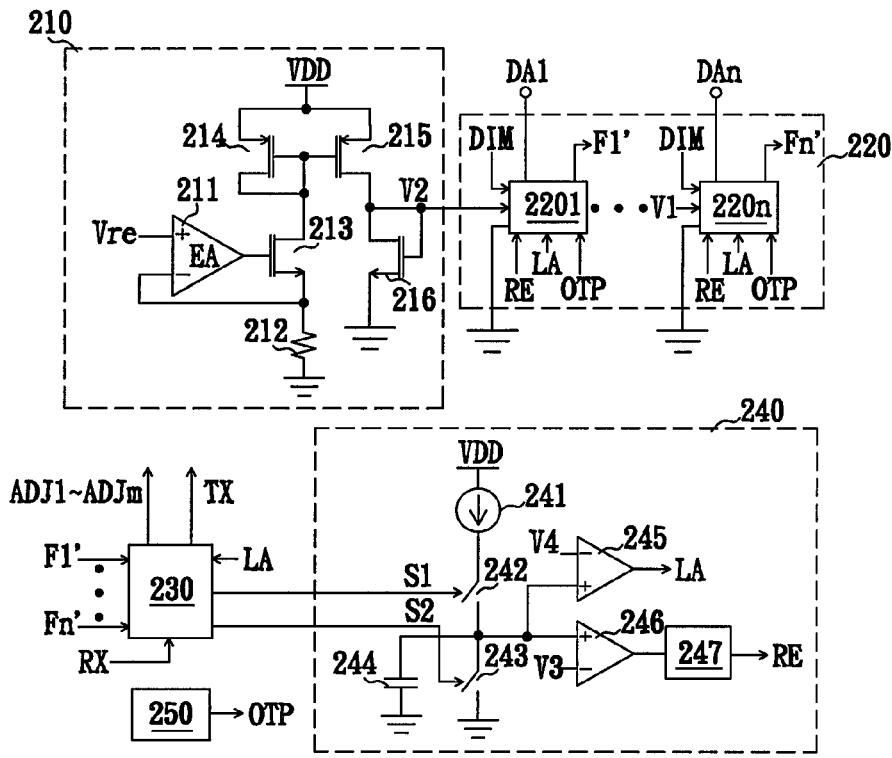
FIG. 5 is a schematic circuit diagram of an LED current balancer according to another embodiment of the invention.

FIG. 5 is a schematic circuit diagram of an LED current balancer according to another embodiment of the invention. Referring to FIG. 5, the LED current balancer includes a current setting circuit 210, a current balance detecting circuit 220, an adjustment determining circuit 230, a time determining circuit 240, and an over temperature protection circuit 250. The current setting circuit 210 includes an error amplifier 211, a resistor 212, n-type metal oxide semiconductor (MOS) transistors 213 and 216, and p-type MOS transistors 214 and 215. The resistor 212 generates a detecting signal to the inverting input end of the error amplifier 211 to be compared with a reference voltage Vre. The error amplifier 211 controls the current flowing through the n-type MOS transistor 213 according to the compared result, so that the voltage drop of the resistor 212 is equal to the reference voltage Vre. The p-type MOS transistors 214 and 215 form a current mirror to mirror the current flowing through the n-type MOS transistor 213 to the n-type MOS transistor 216 and generate a current setting signal V2.

The current balance detecting circuit 220 includes at least one LED current control circuit 2201-220$n$. Herein, n is an integer larger than zero. The LED current control circuits 2201-220$n$ receive the current setting signal V2 to adjust the currents flowing through the current balance ends DA1, DA2, . . . , and DAn, so that the currents are identical and balanced. The LED current control circuits 2201-220$n$ receive a light adjusting signal DIM to control the ratio of the period when the current is conducted and the period when the current is cut off according to the light adjusting signal DIM. When the current is conducted, a predetermined current flows through each LED strings, so that the LED strings emit light. On the contrary, when the current is cut off, the current flowing through each LED strings is zero, so that the LED strings do not emit light. Accordingly, the brightness dimming of the LED module is achieved. The LED current control circuits 2201-220$n$ simultaneously determine whether the corresponding current balance end DA1-DAn are lower than a protecting voltage value. If so, the LED current control circuits 2201-220n generate protection signals F1'-Fn'. Setting the protecting voltage value ensures that the transistor switches in each of the LED current control circuits 2201-220n can operate in the saturation region.

The over temperature protection circuit 250 generates an over temperature protection signal OTP when the operation temperature of the LED current balancer is higher than a predetermined over temperature, so that the LED current control circuits 2201-220n stop conducting current until the temperature decreases under the predetermined over temperature again. Referring to FIG. 2 and FIG. 5, if receiving any of the protection signals F1'-Fn', the adjustment determining circuit 230 generates at least one adjustment control signal ADJ1-ADJm to adjust the set or the mode of the voltage feedback circuit 190. Because of a delay time existing when the output voltage VO of the power supply 170 is adjusted to stabilized at a new voltage, the adjustment determining circuit 230 outputs the control signals S1 and S2, so that the time determining circuit 240 starts to count time to prevent the adjustment determining circuit 230 from error due to the delay time.

Figure 6:
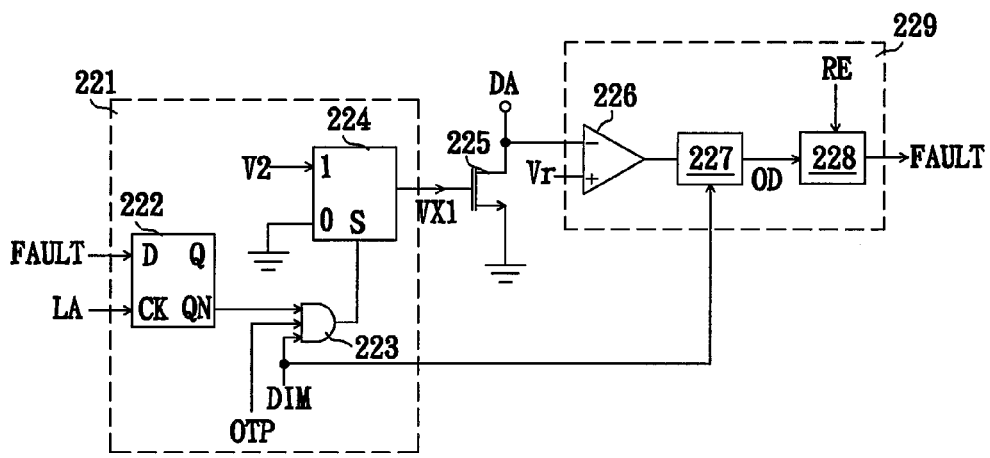
FIG. 6 is a schematic circuit diagram of an LED current control circuit according to an embodiment of the invention.

FIG. 6 is a schematic circuit diagram of an LED current control circuit according to an embodiment of the invention. Referring to FIG. 6, each of the LED current control circuit 2201-220n includes a current control unit 221, a current adjusting unit 225, and a detecting circuit 229. The current control unit 221 includes a D flip-flop 222, an AND gate 223, a multiplexer 224. The current control unit 221 is used to generate a current control signal VX1 to control the amount of the current flowing through the current control end DA of the current adjusting unit 225 (i.e. the mentioned-above current balance ends DA1, DA2, ..., and DAn), thereby controlling the current of the LED string. In the present embodiment, the current adjusting unit 225 may be an n-type transistor switch which adjusts the equivalent resistor thereof according to the current control signal VX1 to determine the amount of the current flowing through the corresponding LED string, thereby achieving the function of adjusting current. The AND gate 223 receives the output signal of the output end QN of the D flip-flop 222, the over temperature protection signal OTP, and the light adjusting signal DIM, and accordingly, controls the multiplexer 224 to select the current setting signal V2 or the zero voltage level (i.e. the ground voltage level) to be outputted. When the multiplexer 224 selects the current setting signal V2 to serve as the current control signal VX1, the current adjusting unit 225 controls a stable current to flow through the corresponding LED string. On the contrary, when the multiplexer 224 selects the zero voltage level to be outputted, the current adjusting unit 225 controls the current of the corresponding LED string to be zero, so that the LED string stops emitting light.

The detecting unit 229 includes a comparator 226, a delay circuit 227, and a latch 228. The detecting unit 229 is used to detect the current control end DA and determines whether to generate a protecting signal FAULT (i.e. the mentioned-above protection signals F1'-Fn') according to a voltage protecting value Vr. Setting the protecting voltage value Vr ensures that the n-type transistor switch in the current adjusting unit 225 can operate in the saturation region. The protecting voltage value Vr may be a reference signal with a constant level or a reference signal which is adjusted according to the level of the current control signal VX1. The advantage of the reference signal with the constant level is that the design of the circuit is simple. The advantage of the reference signal which is adjusted according to the level of the current control signal VX1 is that the level of the reference signal can be adjusted with the gate-source voltage, so that the setting is more exact. The delay circuit 227 can also receive the light adjusting signal DIM simultaneously to serve as the time counting signal for the delay time.

Referring to FIG. 5 and FIG. 6, the operation of the LED current balancer will be given.

The time determining circuit 240 includes a current source 241, a first switch 242, a second switch 243, a capacitor 244, a first comparator 245, a second comparator 246, and a one-shot circuit 247. When all the protection signals F1'-Fn' are low, so that the adjustment determining circuit 230 determines not to adjust the set or the mode of the voltage feedback circuit 190, the adjustment determining circuit 230 outputs the control signals S1 and S2 to cut off the first switch 242 and turn on the second switch 243, so that the capacitor 244 discharges. All the protection signals F1'-Fn' being low represents that the levels of the current balance ends DA1, DA2, ..., and DAn are all higher than the level of the voltage protecting value Vr. At this time, the voltage drop of the capacitor 244 is lower than the reference voltages V3 and V4 (herein, the reference voltage V3 is lower than the reference voltage V4). Accordingly, the first comparator 245 outputs a trigger signal LA with a low level, and the second comparator 246 outputs a comparison signal with the low level, so that the one-shot circuit 247 also outputs a reset signal RE with the low level. The comparison signal LA is transmitted to the trigger end CK of the D flip-flop 222 in the current control unit 221 to trigger the D flip-flop 222 to detect the protecting signal FAULT of the input end D. At this time, the comparison signal LA is low, and thus, the D flip-flop 222 does not detect the protecting signal FAULT, so that the level of the current control signal VX1 remains constant. Because the level of the current control end DA is higher than the voltage protecting value Vr, the comparator 226 outputs the signal with the low level, and also the reset signal RE is low, accordingly, the AND gate 227 and the latch 228 respectively output the delay signal OD and the protecting signal FAULT with the low level. Accordingly, when the comparison signal LA and the reset signal RE are low, operations of the LED current control circuits 2201-220n are maintained unchanged.

When any of the protection signals F1'-Fn' is high, i.e. any of the levels of the current balance ends DA1, DA2, ..., and DAn is lower than the voltage protecting value Vr, the adjustment determining circuit 230 determines to adjust the set or the mode of the voltage feedback circuit 190, and thus, the adjustment determining circuit 230 outputs the control signals S1 and S2 to turn on the first switch 242 and cut off the second switch 243, so that the capacitor 244 is charged. The current balance ends DA1, DA2, ..., and DAn having the level higher than the voltage protecting value Vr are still are maintained as the previous operation without change, but the operation of the LED current control circuits corresponding to the current balance ends DA1, DA2, ..., and DAn having the level lower than the voltage protecting value Vr is different, and it will be described in the following.

When the level of the current control end DA is lower than the voltage protecting value Vr, the comparator 226 outputs a output signal with high level and the delay circuit 227 outputs a high level delay signal OD after a delay time when receiving the high level output signal of the comparator 226 to the latch 228. The delay circuit 227 can eliminate the error due to voltage noises. At this time, because the reset signal RE is low, after receiving the delay signal OD with the high level, the latch 228 also outputs the protecting signal FAULT with the high level, so that the adjustment determining circuit 230 outputs the adjustment control signals ADJ1-ADJm and controls the time determining circuit 240 to charge the capacitor 244. When the cross voltage of the capacitor 244 is equal to the reference voltages V3, the second comparator 246 outputs the signal with the high level, so that the one-shot circuit 247 generates a pulse signal as the reset signal RE. Accordingly, the latch 228 is reset to output the protecting signal FAULT with the low level. When the cross voltage of the capacitor 244 is continuously raised to be equal to the reference voltages V4, the first comparator 245 outputs the trigger signal LA with the high level to the D flip-flop 222, so that the D flip-flop 222 detects the protecting signal FAULT again.

During the time interval from the time when the protecting signal FAULT is high to the time when the reset signal RE is generated, the level of the current control end DA will be returned above the protecting voltage value Vr. Furthermore, during the time interval from the time when the reset signal RE is generated to the time when the trigger signal LA is generated, the level of the current control end keeps being higher than the protecting voltage value Vr, so that the detecting unit 229 does not generate the protecting signal FAULT with the high level anymore. If not, the detecting unit 229 still generates the protecting signal FAULT with the high level. It represents that the corresponding LED string is not able to be raised to be higher than the protecting voltage value Vr due to open-circuit, or other issues occurring in the current control end DA. Accordingly, the protecting signal FAULT is maintained at the high level, so that the current adjusting unit 225 is controlled to stop conducting current to avoid the issues which may occur under the abnormal condition.

Next, a description regarding the operation of the adjustment determining circuit 230 is provided below. The adjustment determining circuit 230 may be a finite state machine or other circuits similar thereto. The adjustment determining circuit 230 generates the adjustment control signals ADJ1-ADJm when at least one of the protection signals F1'-Fn' is high. After receiving the trigger signal LA, the adjustment determining circuit 230 determines whether the number of the protection signals F1'-Fn' with the high level decreases, and turns on the second switch 243 and cuts off the first switch 242 so as to discharge the capacitor 244 for the next operation. When the number of the protection signals F1'-Fn' with the high level can not decrease, it represents that the issue can not be solved by adjusting the voltage feedback circuit 190. Accordingly, the adjustment determining circuit 230 adjusts the voltage feedback circuit 190 to go back to the set or the mode before it is adjusted. When the number of the protection signals F1'-Fn' with the high level decreases, it represents that the issue regarding a part of the current balance ends DA1-DAn having the over low voltages can be solved by adjusting the voltage feedback circuit 190. Accordingly, the adjustment determining circuit 230 records the present set or the present mode of the voltage feedback circuit 190. When the number of the protection signals F1'-Fn' with the high level decreases but is larger than zero, the adjustment determining circuit 230 repeats the above operation until the number thereof is zero or not changes.

Furthermore, if a plurality of LED current balancers is applied to the same LED driving circuit, the adjustment determining circuit 230 receives an adjustment coordinating signal RX and outputs an adjustment coordinating output signal TX to operate with the other LED current balancers in the same LED driving circuit, and it will be described in the following. When the adjustment determining circuit 230 detects that any of the protection signals F1'-Fn' is high but not receives the adjustment coordinating signal RX, the adjustment determining circuit 230 generates the adjustment control signals ADJ1-ADJm and the adjustment coordinating output signal TX. When the adjustment determining circuit 230 detects that any of the protection signals F1'-Fn' is high and simultaneously receives the adjustment coordinating signal RX, it represents that the other LED current balancers have proceeded to change the set or the mode of the voltage feedback circuit 190. Accordingly, the LED current balancer does not require proceeding the adjustment simultaneously, so that the adjustment determining circuit 230 stops changing the set or the mode of the voltage feedback circuit 190.

It should be noted that, the main difference between the LED current control circuits respectively shown in FIG. 6 and FIG. 4 lies in that each of the LED current control circuits shown in FIG. 6 has the multiplexer 224 and the comparator 226. Accordingly, each of the adjustment determining circuit 230 can independently determine whether the current control end DA is lower than the voltage protecting value Vr and independently control the current of the LED string to be zero to stop the controlled LED string emitting light. On the contrary, for the LED current control circuits shown in FIG. 4, the adjustment determining circuit 130 determines whether any of the current control ends DA is lower than the voltage protecting value Vr at the same time. If so, and it can not be eliminated, the adjustment determining circuit 130 stops all of the LED strings emitting light at the same time. Furthermore, in the embodiment of FIG. 6, the current balance is achieved by a current mirror which is formed by the n-type transistor in the current adjusting unit 225 of the LED current control circuit shown in FIG. 6. Otherwise, in the embodiment of FIG. 4, the current balance is achieved by a current source which is formed by the current adjusting unit 125, the error amplifier 126, and the resistor 127.

FIG. 7A is a schematic circuit diagram of a voltage feedback circuit according to a first embodiment of the invention. Referring to FIG. 7A, in the present embodiment, the voltage feedback circuit includes a first resistor R1 and a second resistor R2. Herein, the second resistor R2 is an adjustable resistor. The adjustment determining circuit 230 adjusts the resistance of the second resistor R2 by controlling the level of the adjustment control signal ADJ. Accordingly, if any of the levels of the current balance ends DA1-DAn is lower than the voltage protecting value Vr, the adjustment determining circuit 230 decreases the resistance of the second resistor R2 to decrease the dividing ratio of the voltage feedback circuit. Hence, the power supply 170 increases the output voltage VO to increase the voltages of the current balance ends DA1-DAn. Furthermore, because of the characteristic of LED having the threshold voltage with a negative temperature parameter, when the temperature increases, the threshold voltage decreases. Accordingly, the voltage feedback signal generated by the voltage feedback circuit can be set to have a positive temperature parameter. For example, the first resistor R1 with a negative temperature parameter is adopted, so that the output voltage VO has a positive temperature parameter. Accordingly, when the temperature increases, the output voltage VO decreases to compensate the decrease of the threshold voltage.

FIG. 7B is a schematic circuit diagram of a voltage feedback circuit according to a second embodiment of the invention. Referring to FIG. 7B, in the present embodiment, the voltage feedback circuit includes a first resistor R1, a third resistor R3, and a plurality of adjusted resistors RA1-Ram connects in parallel with the third resistor R3. The adjusted resistors RA1-Ram are respectively coupled to the adjustment switches SW1-SWm in series, and the adjustment switches SW1-SWm are controlled by the adjustment control signals ADJ1-ADJm. When all of the adjustment switches SW1-SWm are cut off, the voltage feedback circuit stays in a first feedback mode. At this time, the voltage feedback circuit has a first dividing ratio R3/(R1+R3), and the first dividing ratio corresponds to a first voltage value to have the output voltage VO being stabilized at the first voltage value. When the adjustment switch SW1 is turned on, and the adjustment switches SW2-SWm are cut off, the voltage feedback circuit stays in a second feedback mode. At this time, the voltage feedback circuit has a second dividing ratio (R3//RA1)/(R1+R3//RA1), and the second dividing ratio corresponds to a second voltage value to have the output voltage VO being stabilized at the second voltage value. Furthermore, when the adjustment switch SW2 is turned on, and the adjustment switches SW1 and SW3-SWm are cut off, the voltage feedback circuit stays in a third feedback mode. At this time, the voltage feedback circuit has a third dividing ratio (R3//RA2)/(R1+R3//RA2), and the third dividing ratio corresponds to a third voltage value to have the output voltage VO being stabilized at the third voltage value. In a similar way, other dividing ratios can be obtained.

FIG. 7C is a schematic circuit diagram of a voltage feedback circuit according to a third embodiment of the invention. Referring to FIG. 7C, in the present embodiment, the voltage feedback circuit includes a first resistor R1, a third resistor R3, a fourth resistor R4, and an adjustment circuit 295. The adjustment circuit 295 receives the adjustment control signals ADJ1-ADJm to correspondingly generate one of adjustment voltages V1-Vm. Herein, the adjustment voltages V1-Vm are gradually increased from the adjustment voltage V1 to the adjustment voltage Vm, i.e. the adjustment voltage V1 is smallest, and the adjustment voltage Vm is largest. The adjustment voltages V1-Vm adjust the level of the voltage feedback signal FB by the fourth resistor R4 and the dividing voltage of the third resistor R3. The predetermined initial voltage provided by the adjustment circuit 295 may be the adjustment voltage Vm. At this time, the voltage value at which the output voltage VO is stabilized is smallest. Next, according to the adjustment control signals ADJ1-ADJm, the adjustment circuit 295 provides the different adjustment voltages. Finally, the adjustment circuit 295 provides the adjustment voltage V1. At this time, the voltage value at which the output voltage VO is stabilized is largest.

FIG. 8 shows the waveforms of the output voltages of the voltage feedback circuits respectively shown in FIG. 7A, FIG. 7B, and FIG. 7C in different modes. Referring to FIG. 8, the dotted line 7a is the waveform of the voltage feedback circuit shown in FIG. 7A, and the output voltage VO is adjusted in a linear manner. The solid line 7b is the waveform of the voltage feedback circuit shown in FIG. 7B and FIG. 7C, and the output voltage VO is adjusted with mode1-mode5 in a step-like manner. Certainly, besides the above two exemplary manners, other manners, such as a curve manner, can be applied to the invention.

Accordingly, in the embodiment of the invention, the LED current balancer can determine whether the transistor switches operate in the saturation region based on whether the voltages of the current balance ends DA1-DAn is lower than a protecting voltage value. If not, the output voltage VO is adjusted and increases in the linear manner or in the step-like manner, so that the voltages of the current balance ends DA1-DAn increases to ensure that the transistor switches operate in the saturation region. In the embodiment of the invention, the transistor switches is ensured operating in the saturation region when the driving voltages of the LED strings are different. Moreover, in the embodiment of the invention, when any LED in the LED string is damaged, and the Zener connected in parallel with the damaged LED conducts the current, the enough voltage is still provided, so that the LED string emits light stably. Furthermore, in the embodiment of the invention, the adjustment for the set or the mode of the voltage feedback circuit can have a minimum dividing voltage value, so that the corresponding output voltage VO has a maximum to achieve the over voltage protection. If the LEDs in the LED string are not parallel with the Zener diode, when any LED in the LED string is damaged, the LED string is open. At this time, the corresponding current control end DA is lower than the voltage protecting value Vr to stop operating.

To sum up, in the embodiment of the invention, by adjusting the voltage feedback circuit of the LED driving apparatus, it ensures that the LED string provides stable brightness, and further, enhances the efficiency of the LED driving apparatus.

As the above description, the invention completely complies with the patentability requirements: novelty, non-obviousness, and utility. It will be apparent to those skilled in the art that various modifications and variations can be made to the structure of the invention without departing from the scope or spirit of the invention. In view of the foregoing descriptions, the invention covers modifications, and variations thereof if they fall within the scope of the following claims and their equivalents.

What is claimed is:

1. A light emitting diode (LED) current control circuit, comprising: a current adjusting unit having a current control end coupled to an LED string, and the current adjusting unit determining an amount of a current flowing through the LED string according to a current control signal; a detecting unit detecting the current control end for determining whether to generate a protecting signal according to a protecting voltage value; a current control unit generating the current control signal to control the amount of the current of the LED string, and the current control unit determining whether to stop the current flowing through the LED string according to the protecting signal; and a voltage clamping unit coupled to the current control end, so that a voltage of the current control end is not higher than a clamping voltage value, wherein the clamping voltage value is higher than the protecting voltage value.

2. The LED current control circuit as claimed in claim 1, wherein the detecting unit generates the protecting signal when a voltage of the current control end is lower than the protecting voltage value for a first predetermined time.

3. The LED current control circuit as claimed in claim 1, wherein the detecting unit continuously generates the protecting signal when a voltage of the current control end is lower than the protecting voltage value for a second predetermined time.

4. A light emitting diode (LED) current balancer, adapted to balance currents of a plurality of LED strings, wherein a voltage source circuit provides an output voltage to drive the LED strings, the LED current balancer comprising: a current balancing circuit having a plurality of current balance ends respectively coupled to the LED strings, and the current balancing circuit balancing the currents of the LED strings; a detecting circuit detecting voltages of the current balance ends to generate a plurality of corresponding detecting signals; and an adjustment determining circuit generating at least one adjustment control signal according to the detecting signals, wherein the at least one adjustment control signal controls a voltage feedback circuit to adjust a level of a voltage feedback signal indicative of the output voltage, generated by the voltage feedback circuit, wherein the voltage feedback circuit has at least two feedback modes and determines to operate in one of the feedback modes according to the at least one adjustment control signal.

5. The LED current balancer as claimed in claim 4, wherein each of the feedback modes corresponds to a voltage value, so that the voltage source circuit adjusts the output voltage to the corresponding voltage value according to the feedback mode of the voltage feedback circuit.

6. The LED current balancer as claimed in claim 4, wherein the adjustment determining circuit stops switching the feedback mode of the voltage feedback circuit when receiving an adjustment coordinating signal of another LED current balancer.

7. The LED current balancer as claimed in claim 4, wherein the adjustment determining circuit comprising a finite state circuit to determine the feedback mode of the voltage feedback circuit according to the detecting signals.

8. The LED current balancer as claimed in claim 4, wherein the voltage feedback signal has a positive temperature parameter.

9. The LED current balancer as claimed in claim 4, further comprising:
a voltage clamping circuit for clamping the voltages of the current balance ends, so that the voltages of the current balance ends are not higher than a clamping voltage value.

10. The LED current balancer as claimed in claim 4, wherein when any of the voltages of the current balance ends is lower than a protecting voltage value for a predetermined protecting time, the adjustment determining circuit controls the current balancing circuit to have the current of the corresponding LED string in the LED strings being zero, or the currents of all the LED strings are zero.

11. The LED current balancer as claimed in claim 4, wherein the current balancing circuit controls the currents of the LED strings being zero or a predetermined current value according to a light adjusting signal.

12. The LED current balancer as claimed in claim 4, further comprising an over temperature protection circuit generating an over temperature protection signal when a temperature of the LED current balancer is higher than a predetermined protecting temperature, so that the currents of the LED strings are zero.

13. A light emitting diode (LED) driving apparatus, comprising: an LED module having a plurality of LED strings; a voltage source circuit providing an output voltage to drive the LED module; a voltage feedback circuit generating a voltage feedback signal according to the output voltage, so that the output voltage is stabilized at a first voltage value; and an LED current balancer having a plurality of current balance ends coupled to the LED module and balancing currents flowing through each of the LED strings,
wherein the LED current balancer comprises a voltage clamping circuit for clamping the voltages of the current balance ends, so that the voltages of the current balance ends are not higher than a clamping voltage value, and wherein the LED current balancer detects voltages of the current balance ends and generates at least one adjustment control signal to adjust the voltage feedback signal when any of the voltages of the current balance ends is lower than a protecting voltage value, so that the output voltage is stabilized at a second voltage value, wherein the second voltage value is higher than the first voltage value.

14. The LED driving apparatus as claimed in claim 13, wherein the LED current balancer controls the currents of the LED strings to be zero when a number of the current balance ends lower than the protecting voltage value does not decrease for a predetermined protecting time.

15. The LED driving apparatus as claimed in claim 13, wherein the LED current balancer controls the current of the LED string corresponding to the current balance ends lower than the protecting voltage value to be zero when a number of the current balance ends lower than the protecting voltage value does not decrease for a predetermined protecting time.

16. The LED driving apparatus as claimed in claim 13, wherein the output voltage has a negative temperature parameter.

17. The LED driving apparatus as claimed in claim 13, wherein the voltage feedback signal has a positive temperature parameter.

* * * * *